United States Patent [19]

Schulz et al.

[11] 4,101,469

[45] Jul. 18, 1978

[54] FOAMABLE RESINOUS POLYMER COMPOSITIONS CONTAINING ACID MIXTURES

[75] Inventors: J. Gustav Schulz, Pittsburgh; Edward T. Sabourin, Allison Park, both of Pa.

[73] Assignee: Gulf Research & Development Company, Pittsburgh, Pa.

[21] Appl. No.: 696,743

[22] Filed: Jun. 16, 1976

[51] Int. Cl.$^2$ ............................................... C08J 9/00
[52] U.S. Cl. ...................................... 521/83; 521/143; 521/178; 521/95; 521/101; 521/128
[58] Field of Search ........ 260/515 P, 2.5 HA, 2.5 HB

[56] References Cited

U.S. PATENT DOCUMENTS

| 2,726,262 | 12/1955 | Grosskinsky et al. | 260/515 P |
| 3,153,666 | 10/1964 | Higuchi et al. | 260/515 H |

*Primary Examiner*—Edward M. Woodberry

[57] ABSTRACT

A foamable polymer composition comprising a resinous polymer and a mixture of polycyclic aromatic polycarboxylic acids carrying nuclear nitro groups that is substantially soluble in acetone but substantially insoluble in water obtained as a result of the nitric acid oxidation of a carbonaceous material, such as coal.

12 Claims, No Drawings

FOAMABLE RESINOUS POLYMER COMPOSITIONS CONTAINING ACID MIXTURES

BACKGROUND OF THE INVENTION

1. Field of the Invention

This invention relates to a foamable composition comprising a resinous polymer and a mixture of polycyclic aromatic polycarboxylic acids derived from a carbonaceous material, such as coal.

2. Description of the Prior Art

Foamed resinous polymers, such as thermoplastic or thermosetting polymers, are of significant commercial interest, because they are lightweight and relatively inexpensive, have excellent chemical stability and are easily fabricated into a wide variety of useful articles, such as insulated containers for cold foods, buoyant fillers for life preservers, toys, disposable coffee cups, etc.

In a typical foaming process, the foaming agent is admixed intimately with the resinous polymer and the mixture is heated in a mold above the decomposition temperature of a foaming agent, whereupon the foaming agent decomposes to yield gaseous products which cause the polymer to foam. Thereafter the polymer is cooled and retains its foamed configuration.

Desirably, the foaming agent should be inexpensive, mix well with the resinous polymer, provide sufficient and controllable foaming power and should have no residual adverse effect upon the equipment used during the foaming step or on the resulting foamed polymer.

SUMMARY OF THE INVENTION

We have found a foaming agent that meets all of the above requirements and which is suitable for incorporation into a resinous polymer to form a foamable polymer composition. The foaming agent is a mixture of polycyclic aromatic polycarboxylic acids carrying nuclear nitro groups that is substantially soluble in acetone but substantially insoluble in water obtained as a result of the nitric acid oxidation of a carbonaceous material, such as coal. The mixture used as a foaming agent herein can be prepared in accordance with the procedure defined and claimed in our U.S. application Ser. No. 696,752, now Pat. No. 4,052,448 filed concurrently herewith, entitled Organic Acids and Process for Preparing Same.

As noted, the foaming agents are mixtures of polycyclic aromatic polycarboxylic acids carrying nuclear nitro groups that are substantially soluble in acetone but substantially insoluble in water. The individual components of said mixtures are believed to be composed of condensed and/or non-condensed benzene rings, with an average number of benzene rings in the individual molecules ranging from two to about ten, but generally from three to about eight. On the average, the number of carboxyl groups carried by the individual molecules will range from about four to about ten, generally from about six to about eight, and the average number of nitro groups from about one to about four, generally from about two to about three. The average molecular weight of the mixture will range from about 600 to about 1500, generally from about 700 to about 1000, and the average neutral equivalent will range from about 80 to about 200, generally from about 100 to about 150. A typical analysis of the mixture is defined below in Table I in approximate amounts.

TABLE I

|  | Weight Per Cent | |
| --- | --- | --- |
|  | Broad Range | Preferred Range |
| Carbon | 50 to 60 | 52 to 56 |
| Hydrogen | 3 to 5 | 3.7 to 4.4 |
| Nitrogen | 3 to 6 | 4 to 5 |
| Oxygen | 25 to 45 | 30 to 40 |
| Sulfur | 0.2 to 0.5 | 0.3 to 0.5 |
| Ash | 0.1 to 5 | 0.3 to 3 |

A preferred procedure for obtaining the above mixtures is described as follows. There is introduced into a reactor an aqueous solution of nitric acid and a carbonaceous material. The nitric acid can have a concentration of about five to about 90 percent, but preferably will be in the range of about 10 to about 70 percent. The carbonaceous material is preferably a solid in the form of a slurry, for example, an aqueous slurry containing the carbonaceous material in particulate form and from about 50 to about 90 weight percent of water.

The solid carbonaceous material that can be used herein can have the following composition on a moisture-free basis:

TABLE II

|  | Weight Per Cent | |
| --- | --- | --- |
|  | Broad Range | Preferred Range |
| Carbon | 45 to 95 | 60 to 92 |
| Hydrogen | 2.5 to 7 | 4 to 6 |
| Oxygen | 2.0 to 45 | 3 to 25 |
| Nitrogen | 0.75 to 2.5 | 0.75 to 2.5 |
| Sulfur | 0.3 to 10 | 0.5 to 6 |

The carbon and hydrogen content of the carbonaceous material will reside primarily in multi-ring aromatic compounds (condensed and/or uncondensed), heterocyclic compounds, etc. Oxygen and nitrogen are believed to be present primarily in chemical combination. Some of the sulfur is believed to be present in chemical combination with the aromatic compounds and some in chemical combination with inorganic elements associated therewith, for example, iron and calcium.

In addition to the above the solid carbonaceous material being treated herein will also contain solid, primarily inorganic, compounds which will not be converted to the desired organic mixture, which are termed ash, and are composed chiefly of compounds of silicon, aluminum, iron and calcium, with smaller amounts of compounds of magnesium, titanium, sodium and potassium. The ash content of the carbonaceous material treated will amount to less than about 50 weight percent, based on the moisture-free carbonaceous material, but, in general, will amount to about 0.1 to about 30 weight percent, usually about 0.5 to about 20 weight percent.

Anthracitic, bituminous and subbituminous coal, lignitic materials, and other type of coal products referred to in ASTM D-388 are exemplary of the solid carbonaceous materials which can be treated to produce the organic mixture. Some of these carbonaceous material in their raw state will contain relatively large amounts of water. These can be dried prior to use herein so that the carbonaceous material has a fixed carbon content that does not exceed 86 weight percent and a volatile matter content of at least about 14 weight percent as determined on an ash-free basis. The carbonaceous material, prior to use, is preferably ground in a suitable attrition machine, such as a hammermill, to a size such that at least about 50 percent of the carbonaceous material will pass through a 40-mesh (U.S. Series) sieve. As noted, the carbonaceous material is slurried in a suitable carrier, preferably water, prior to reaction with nitric acid. If desired, the carbonaceous material can be treated, prior to reaction herein, using any conventional means, to remove therefrom any materials forming a part thereof that will not be converted in reaction with nitric acid herein.

The reactant mixture in the reactor is stirred while being maintained at a temperature of about 15° to about 200° C., preferably about 50° to about 100° C., and a pressure of about atmospheric to about 1000 pounds per square inch gauge (about atmospheric to about 70 kilograms per square centimeter), preferably about atmospheric to about 500 pounds per square inch gauge (about atmospheric to about 35 kilograms per square centimeter) for about 0.5 to about 15 hours, preferably about two to about six hours. In order to obtain the desired mixture without losing appreciable amounts of carboxyl and/or nitro groups on the acids that are formed during the oxidation, and to obtain the desired acids in high yields in the reactor, it is absolutely critical that the reaction conditions therein, namely nitric acid concentration, temperature, pressure and reaction time, be so correlated to minimize and, preferably, to avoid decarboxylation and denitrofication. Gaseous products, such as nitrogen oxides, can be removed from the reactor by any suitable manner.

The reaction product removed from the reactor is found to be soluble, or reactable with, sodium hydroxide. At this point it is necessary to separate the oxidized product from the water and nitric acid associated therewith. This separation must be accomplished in a manner so that the carboxyl and nitro groups are not removed from the acid product. Distillation for the removal of water will not suffice, because under the conditions required for such separation, a significant loss of carboxyl groups and nitro groups would occur. Accordingly, we have found that a mechanical separation will suffice. The reaction product is therefore led to a first separator, which can be, for example, a filter or a centrifuge.

The solids that are recovered in the separator, also soluble in sodium hydroxide, are led to a second separator wherein they are subjected to extraction with acetone. Such separation can be carried out at a temperature of about 20° to about 60° C., preferably about 25° to about 50° C., and a pressure of about atmospheric to about 500 pounds per square inch gauge (about atmospheric to about 35 kilograms per square centimeter), preferably about atmospheric to about 100 pounds per square inch gauge (about atmospheric to about seven kilograms per square centimeter). The solid material, insoluble in acetone, is removed from the latter separator by a first line and the acetone solution of the acid mixture by a second line. The acetone solution is then led to a drier wherein acetone is separated therefrom and the desired acetone-soluble, water-insoluble polyaromatic, polycarboxylic acid mixture used herein is recovered. As before, the acid mixture in the drier must be treated by so correlating the conditions therein to remove acetone therefrom in such manner so as to minimize and, preferably, avoid, decarboxylation and denitrofication. The temperature can be in the range of about 10° to about 60° C., preferably about 20° to about 50° C., the pressure about 10 millimeters of mercury to about atmospheric, preferably about 30 millimeters of mercury to about atmospheric, for about 0.5 to about 24 hours, preferably about one to about five hours.

The filtrate obtained in the first separator will contain water, nitric acid and most of the inorganic material (ash) that was present in the carbonaceous charge. In addition there can also be present other oxidized material, which are primarily acetone-soluble, water-soluble organic acids.

The resinous polymers that can be employed herein can include both thermoplastic and thermosetting resins that melt at a temperature up to about 300° C. Thus, the thermoplastic polymers that can be foamed by the use of the foaming agents above described can be virtually any of the thermoplastic polymers known to the art. Thus, for example, my foaming agents can be used to foam styrene polymers, including styrene homopolymers and copolymers of styrene with up to 50% of comonomers such as acrylate and methacrylate esters, acrylonitrile, and the like, graft copolymers of styrene with dienes, particularly the ABS-type graft copolymers, vinyl chloride polymers including vinyl chloride homopolymers and copolymers of vinylchloride with up to 50% of comonomers such as vinyl acetate, vinylidine chloride, esters of fumaric and maleic acid, acrylate and methacrylate esters and so forth. Other suitable resins which can be foamed with the foaming agents here described include the diene rubbers, both natural and synthetic, the acrylate ester polymers, the methacrylate ester polymers, nylon-6, nylon 6,6, the polycarbonates and the newer formaldehyde polymers such as Delrin (a registered trademark of E. I. du Pont) and so forth.

Especially useful foamable compositions are obtained by admixing the foaming agents hereabove described with thermoplastic polymers of a 2–4 carbon atom alpha olefin, e.g., ethylene, propylene, and butene-1. The olefin polymer can be a homopolymer of any one of the olefin species set forth above or can be a copolymer derived solely from these olefins, such as an ethylene-propylene copolymer. The olefin copolymers also can be copolymers having polymerized therein at least fifty weight percent of an alpha olefin with up to fifty weight percent of a vinylidine monomer copolymerizable therewith. Typical examples of suitable comonomers include the vinyl halides such as vinyl chloride, conjugated 1,3-diolefins such as butadiene and isoprene, vinyl esters of monobasic organic acids such as vinyl acetate, vinyl benzoate, and vinyl stearate, esters, amides, and nitriles of alpha,beta-ethylenically unsaturated monobasic acids, such as the methyl, ethyl, and octyl acrylates, the corresponding esters of methacrylic acid, acrylonitrile, methacrylonitrile, acrylamide, and methacrylamide and so forth.

Among the thermosetting resins that can be foamed by the use of the foaming agents above described are epoxy resin formulations, such as a combination of EPON 1004 with benzophenone-3,4,3',4'-tetracarboxylic dianhydride or EPON 828, with dimethylbenzylsuccinic anhydride and hexyldimethylamine, etc.

In preparing the foamable composition defined and claimed herein any suitable procedure for obtaining an initimate mixture of the foaming agent defined above and the resinous polymer can be used. For example, the components can be admixed by passing them together through rollers, blenders, mixers, etc. It is important, however, that such mixing be carried out at a temperature below the temperature at which the foaming agent decomposes in order to avoid premature foaming. The foaming agent herein will decompose to produce carbon dioxide at a temperature in the range of about 50° to about 350° C., generally in the range of about 100° to about 300° C. When the foaming agent herein decomposes in use it will produce about 10 to about 150 milliliters of gas, substantially carbon dioxide, generally about 50 to about 125 milliliters of gas, per gram of foaming agent.

The weight ratio of resinous polymer to foaming agent in the claimed composition can vary over a wide range, generally in the range of about 100:1 to about 1:1, but usually will be in the range of about 50:1 to about 5:1. If necessary, or if desired, a hardening agent to help set the foamed plastic to prevent a substantial volume reduction, for example, a cross-linking agent or a curing agent, such as benzophenone-3,4,3′,4′-tetracarboxylic dianhydride, dimethylbenzylsuccinic anhydride, allyl cyanurate, divinylbenzene, etc., can also be incorporated into the composition. A free radical initiator, such as cumene hydroperoxide, dicumyl peroxide, etc., a pore size modifier, such as silicon oil, olive oil, etc., an accelerator, such as dimethylbenzylamine, can similarly be included. Each of these can be used in amounts, for example, in the range of about one to about 50 weight percent, preferably about one to about 10 weight percent, based on the combined weight of the resin and the foaming agent. In cases where no additives are included in the foamable composition, the foamed resin obtained can be set by cooling as soon as foaming ceases.

DESCRIPTION OF PREFERRED EMBODIMENTS

Several runs were carried out in which a North Dakota lignite analyzing as follows, on a substantially moisture-free basis, was subjected to oxidation using nitric acid as the oxidant: 65.03 weight percent carbon, 4.0 weight percent hydrogen, 27.0 weight percent oxygen, 0.92 weight percent sulfur, 0.42 weight percent nitrogen and 0.04 weight percent moisture. The ash was further analyzed and found to contain 43 weight percent oxygen, 7.8 weight percent sulfur and the remainder metals.

In each of Runs Nos. 3 to 5, the data of which are summarized below in Table III, 70 percent aqueous nitric acid was used. In Runs Nos. 1 and 2 the aqueous nitric acid used had a concentration of 90 percent. In Runs Nos. 4 and 5 over a period of two hours 100 milliliters of the defined nitric acid was gradually added to the stirred slurry containing 100 grams of powdered lignite defined above (corresponding to 67.5 grams of moisture-free feed) and 370 grams of water while maintaining the contents at selected temperature levels and atmospheric pressure. In Run No. 3, otherwise identical to Runs Nos. 4 and 5, a five-hour reaction time was employed. In the remaining runs solid lignite was added gradually to 411 milliliters of nitric acid at a rate sufficient to maintain the reaction temperature. Nitrogen oxides were permitted to escape from the reaction zone as they evolved.

At the end of the reaction period the product slurry was withdrawn from the reaction zone and filtered to obtain a solids fraction and a filtrate. The solids were extracted with acetone at atmospheric temperature and pressure. The acetone solution was then subjected to evaporation at atmospheric temperature and pressure to obtain the novel mixture herein. The acetone insoluble portion was found to be soluble in sodium hydroxide and to comprise organic acids of a relatively lower carboxyl functionality than the acetone-soluble portion.

In each of Runs Nos. 1 to 6 some acetone soluble, water-soluble organic acids were also found. The work-up of the filtrate was carried out as follows. Initially the filtrate was subjected to distillation to separate unreacted nitric acid and water therefrom. The remaining solids were subjected to extraction with acetone at atmospheric temperature and atmospheric pressure. The acetone solution was dried to remove acetone therefrom, resulting in the recovery of small amounts of the acetone-soluble, water-soluble organic acids completely soluble in sodium hydroxide. The average molecular weight of the mixtures obtained was about 800 and the average neutral equivalent about 110. The residue was mainly ash. In each run three grams of the acetone-soluble mixture recovered was placed in 25 milliliters of a mineral oil and the resulting mixture was immersed in an oil bath maintained at 170° C. and the volume of gas evolved over a period of 30 minutes was measured. The data obtained are summarized below in Table III.

TABLE III

| Run No. | Temperature, ° C. | Reaction Time, Hours | Acetone-Soluble, Water-Insoluble Product, Grams | Analysis of Product, Weight Per Cent | | | | | | Milliliters of Gas Evolved Per Gram of Acetone-Soluble Material Heated |
|---|---|---|---|---|---|---|---|---|---|---|
| | | | | Carbon | Hydrogen | Nitrogen | Oxygen | Sulfur | Ash | |
| 1 | 15 | 2 | 85.6 | 48.03 | 3.33 | 4.53 | 41.06 | 0.24 | 2.81 | 67 |
| 2 | 30 | 2 | 71.4 | 48.03 | 3.57 | 5.10 | 40.63 | 0.19 | 2.48 | 70 |
| 3 | 50 | 5 | 67.0 | 56.30 | 4.80 | 4.60 | 33.27 | 0.31 | 0.72 | 55 |
| 4 | 70 | 2 | 51.1 | 55.52 | 3.72 | 4.70 | 35.13 | 0.30 | 0.63 | 40 |
| 5 | 90 | 2 | 52.5 | 53.94 | 4.38 | 4.61 | 36.39 | 0.25 | 0.43 | 34 |

EXAMPLE I

Fifty grams of a copolymer composed of 80 weight percent polyethylene and 20 weight percent methylacrylate having a melt index of 2000 was heated to its melting point (120° C.). To the melted resin there was added, while stirring, three grams of 2-ethylhexyl acrylate and 0.75 gram of triallyl isocyanurate, as cross-linking agents, and 0.5 grams of a silicone oil, as a pore size modifier. The stirring was continued for 10 munutes until a homogeneous mixture was obtained and then, similarly, five grams of the acetone-soluble mixture obtained in Run No. 5 and one gram of dicumylperoxide, as a free radical initiator, was incorporated into the mixture. The resulting mixture was placed in an oven maintained at 175° C. for a period of 30 minutes, removed and cooled to room temperature. A good, semi-rigid foam of fine cellular structure having a density of about 0.05 gm/cubic centimeter was obtained. It was found that 50 grams of the mixture before heating had expanded to 500 cubic centimeters of foamed material.

EXAMPLE II

Twenty-five grams of EPON 1004 (Shell Chemical Co.), an epoxy resin believed to be the diglycidyl ether of Bisphenol A having an epoxy equivalent of 900, 0.01 gram of tin octanoate, as an accelerator, five grams of the acetone-soluble mixture obtained in Run No. 3 and four grams of benzonephenone-3,4,',4'-tetracarboxylic dianhydride, as a cross-linking agent, were intimately mixed and placed in a glass container which was then immersed in an oil bath maintained at 170.C. for 30 minutes. The heated material was then cooled to room temperature. A rigid foamed epoxy resin was obtained. The original mixture of 25 cubic centimeter before heating had expanded to 350 cubic centimeter.

EXAMPLE III

Twenty grams of EPON 828 (Shell Chemical Co.) having an epoxy equivalent of 0.106, 21 grams of dimethylbenzylsuccinic anhydride, as a curing agent or cross-linking agent, and four grams of benzyldimethylamine, as an accelerator, were mixed intimately with five grams of the acetone-soluble mixture obtained in Run No. 3 and the mixture was placed in a 250 milliliter glass jar. The glass jar was immersed in an oil bath maintained at 180° C. for a period of one hour, after which the heated material was cooled to room temperature. The original mixture which had a volume of 50 milliliters had foamed to a volume of 250 milliliters. The rigid foamed epoxy resin was found to have an extremely fine pore structure and possessed excellent crush strength.

EXAMPLE IV

Fifty grams of low density polyethylene [Gulf Oil Corporation PE 1008.5 having a melt index of 22 (ASTM D 1238-62T) and a density of 0.917 (ASTM D 1505-63T)], five grams of the acetone-soluble mixture obtained in Run No. 3 and one gram of dicumyl peroxide, as a cross-linking agent, were ground together to form a homogeneous powder mixture and placed in a 500 milliliter jar immersed in an oil bath maintained at 190° C. The mixture was stirred and maintained in the oil bath until liquification began, after which the jar was placed in an over maintained at 190° to 195° C. for one hour and then cooled to room temperature. The original volume of the mixture, which was 55 milliliters, had increased to 350 milliliters. The resulting polyethylene foam was rigid and possessed a uniform pore structure.

EXAMPLE V

In order to assess the foaming capacity of the mixture of polycyclic aromatic polycarboxylic acids used herein, three grams of the acetone-soluble mixture obtained in Run No. 3 were placed in a 50-milliliter round bottom flask suspended in 25 milliliters of mineral oil for 30 minutes at selected temperature levels and the gas evolution at the end of each heating period was measured.

The results obtained are set forth below in Table IV.

TABLE IV

| Temperature, ° C. | Milliliter of Gas Evolved Per Gram |
|---|---|
| 75 | 2 |
| 110 | 10 |
| 140 | 28 |
| 175 | 55 |
| 200 | 69 |
| 225 | 90 |
| 250 | 107 |
| 300 | 125 |

Not only are the foaming agents present in our foaming compositions particularly effective, as the above examples show, but the gases given off, carbon dioxide, are not toxic or noxious, and the inert residue, primarily carbonaceous, serves as a filler in the foamed resin.

Obviously, many modifications and variations of the invention, as hereinabove set forth, can be made without departing from the spirit and scope thereof and, therefore, only such limitations should be imposed as are indicated in the appended claims.

We claim:

1. A foamable polymer composition comprising a resinous polymer selected from the group consisting of thermoplastic and thermosetting resins that melt at a temperature up to about 300° C. and a mixture of polycyclic aromatic polycarboxylic acids carrying nuclear nitro groups that is soluble in acetone but insoluble in water, wherein the average number of benzene rings in the individual acid molecules ranges from two to about ten, the average number of carboxyl groups carried by the individual acid molecules ranges from about four to about ten, the average number of nitro groups carried by the individual acid molecules ranges from about one to about four, the average molecular weight of the acid mixture ranges from about 600 to about 1500 and the average nuclear equivalent of the acid mixture ranges from about 80 to about 200, said acid mixture having been prepared by reacting coal with aqueous nitric acid having a concentration of about five to about 90 percent at a temperature in the range of about 15° to about 200° C. for about 0.5 to about 15 hours at a pressure of about atmospheric to about 1000 pounds per square inch gauge, mechanically separating the solids in the resulting reaction mixture, extracting the resulting solids with a polar solvent and then separating the polar solvent from the extract to recover said acid mixture.

2. The composition of claim 1 wherein the resinous polymer is polyethylene.

3. The composition of claim 1 wherein the resin is an epoxy resin.

4. The composition of claim 1 wherein the average number of benzene rings in the individual acid molecules ranges from about three to about eight.

5. The composition of claim 1 wherein the average number of carboxyl groups carried by the individual acid molecule ranges from about six to about eight.

6. The composition of claim 1 wherein the average number of nitro groups carried by the individual acid molecule ranges from about two to about three.

7. The composition of claim 1 wherein the average molecular weight of the acid mixture ranges from about 700 to about 1000.

8. The composition of claim 1 wherein the average nuclear equivalent of the acid mixture ranges from about 100 to about 150.

9. The acid mixture of claim 1 wherein the analysis thereof is in the following range:

| | Weight Per Cent |
|---|---|
| Carbon | 50 to 60 |
| Hydrogen | 3 to 5 |
| Nitrogen | 3 to 6 |
| Oxygen | 25 to 45 |
| Sulfur | 0.2 to 0.5 |
| Ash | 0.1 to 5 |

10. The acid mixture of claim 1 wherein the analysis thereof is in the following range (preferred range):

|  | Weight Per Cent |
| --- | --- |
| Carbon | 52 to 56 |
| Hydrogen | 3.7 to 4.4 |
| Nitrogen | 4 to 5 |
| Oxygen | 30 to 40 |
| Sulfur | 0.3 to 0.5 |

-continued

|  | Weight Per Cent |
| --- | --- |
| Ash | 0.3 to 3 |

11. The composition of claim 1 wherein a hardening agent is also present.

12. The composition of claim 1 wherein an accelerator is also present.

* * * * *